US012100063B2

(12) United States Patent
Garud et al.

(10) Patent No.: US 12,100,063 B2
(45) Date of Patent: *Sep. 24, 2024

(54) IMAGE COMPRESSION/DECOMPRESSION IN A COMPUTER VISION SYSTEM

(71) Applicant: Texas Instruments Incorporated, Dallas, TX (US)

(72) Inventors: Hrushikesh Tukaram Garud, Parbhani (IN); Ankit Ajmani, Ambala (IN); Soyeb Noormohammed Nagori, Bangalore (IN); Mihir Narendra Mody, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,251

(22) Filed: Aug. 2, 2022

(65) Prior Publication Data

US 2022/0375022 A1    Nov. 24, 2022

Related U.S. Application Data

(63) Continuation of application No. 16/858,596, filed on Apr. 25, 2020, now Pat. No. 11,410,265, which is a (Continued)

(51) Int. Cl.
*H04N 19/91* (2014.01)
*G06T 1/20* (2006.01)
(Continued)

(52) U.S. Cl.
CPC .............. *G06T 1/20* (2013.01); *G06T 1/60* (2013.01); *G06T 9/00* (2013.01); *H04N 19/91* (2014.11); *G06T 2200/28* (2013.01)

(58) Field of Classification Search
CPC ......... G06T 1/20; G06T 1/60; G06T 2200/28; G06T 9/00; H04N 19/91
See application file for complete search history.

(56) References Cited

U.S. PATENT DOCUMENTS

| 4,646,148 A | * | 2/1987 | Lienard | ............... | H04N 19/593 |
| | | | | | 375/240 |
| 6,614,483 B1 | * | 9/2003 | Lee | .......................... | G06T 9/00 |
| | | | | | 348/391.1 |

(Continued)

FOREIGN PATENT DOCUMENTS

CN              1968418 A         5/2007

OTHER PUBLICATIONS

Majid Rabbani and Rajan Joshi, "An Overview of the JPEG 2000 Still Image Compression Standard", Signal Processing: Image Communication, vol. 17, Issue 1, Jan. 2002, Elsevier Science, pp. 3-48.

(Continued)

*Primary Examiner* — Ian L Lemieux
(74) *Attorney, Agent, or Firm* — Brian D. Graham; Frank D. Cimino; Xianghui Huang (57) ABSTRACT

A computer vision system is provided that includes a camera capture component configured to capture an image from a camera, a memory, and an image compression decompression engine (ICDE) coupled to the memory and configured to receive each line of the image, and compress each line to generate a compressed bit stream. To compress a line, the ICDE is configured to divide the line into compression units, and compress each compression unit, wherein to compress a compression unit, the ICDE is configured to perform delta prediction on the compression unit to generate a delta predicted compression unit, compress the delta predicted compression unit using exponential Golomb coding to generate a compressed delta predicted compression unit, and (Continued)

add the compressed delta predicted compression unit to the compressed bit stream.

20 Claims, 6 Drawing Sheets

Related U.S. Application Data continuation of application No. 15/695,266, filed on Sep. 5, 2017, now Pat. No. 10,706,492.

(51) Int. Cl.
*G06T 1/60* (2006.01)
*G06T 9/00* (2006.01)

(56) References Cited

U.S. PATENT DOCUMENTS

| | | | |
|---|---|---|---|
| 7,039,241 B1 | 5/2006 | Van Hook | |
| 7,221,483 B2 | 5/2007 | Yagishita et al. | |
| 7,308,402 B2 | 12/2007 | Zhou | |
| 7,936,938 B2 | 5/2011 | Gisquet | |
| 8,229,235 B2* | 7/2012 | Kim | H04N 19/152 |
| | | | 382/234 |
| 8,947,273 B2* | 2/2015 | Bartnik | H04N 19/156 |
| | | | 341/67 |
| 9,712,830 B1 | 7/2017 | Horn | |
| 2006/0088221 A1 | 4/2006 | Henry | |
| 2006/0215923 A1 | 9/2006 | Beatty | |
| 2007/0217703 A1 | 9/2007 | Kajiwara | |
| 2007/0248271 A1 | 10/2007 | Sakai et al. | |
| 2008/0253460 A1* | 10/2008 | Lin | H03M 7/42 |
| | | | 375/240.23 |
| 2009/0238259 A1 | 9/2009 | Yeh | |
| 2010/0290533 A1 | 11/2010 | Minagawa | |
| 2011/0080947 A1 | 4/2011 | Chen et al. | |
| 2012/0039383 A1 | 2/2012 | Huang et al. | |
| 2013/0051457 A1 | 2/2013 | Joshi et al. | |
| 2013/0272389 A1 | 10/2013 | Sze et al. | |
| 2013/0301720 A1 | 11/2013 | Lee et al. | |
| 2014/0210652 A1 | 7/2014 | Bartnik | |
| 2015/0003751 A1* | 1/2015 | Aiba | H04N 19/182 |
| | | | 382/233 |
| 2015/0011194 A1 | 1/2015 | Rodriguez | |
| 2015/0189304 A1 | 7/2015 | Bretscher | |
| 2015/0189321 A1* | 7/2015 | Chen | H04N 19/597 |
| | | | 375/240.02 |
| 2015/0195573 A1* | 7/2015 | Aflaki Beni | H04N 19/513 |
| | | | 375/240.16 |
| 2015/0326859 A1* | 11/2015 | Chono | H04N 19/126 |
| | | | 375/240.03 |
| 2015/0341655 A1 | 11/2015 | Joshi | |
| 2015/0341673 A1 | 11/2015 | Joshi | |
| 2016/0227214 A1 | 8/2016 | Rapaka et al. | |
| 2016/0227226 A1* | 8/2016 | Rapaka | H04N 19/103 |
| 2016/0227247 A1* | 8/2016 | Zou | H04N 19/137 |
| 2017/0105014 A1* | 4/2017 | Lee | H04N 19/85 |
| 2017/0223351 A1* | 8/2017 | Zhang | H04N 19/147 |
| 2017/0264918 A1 | 9/2017 | Thirumalai | |
| 2017/0332102 A1* | 11/2017 | Kim | H04N 19/60 |
| 2018/0020241 A1 | 1/2018 | Li | |
| 2018/0109802 A1* | 4/2018 | Takeda | H04N 19/105 |

OTHER PUBLICATIONS

Matt Marcus, "JPEG Image Compression", Dartmouth College, Jun. 1, 2014, pp. 1-5.
Donald Hepkin, "Active Memory Expansion: Overview and Usage Guide", IBM Corporation, Feb. 9, 2010, pp. 1-25.
Notification of Transmittal of the International Search Report and the Written Opinion of the International Searching Authority, or the Declaration; PCT/US 2018/049519; mail date: Dec. 13, 2018; 8 pages.

\* cited by examiner

IMAGE COMPRESSION/DECOMPRESSION IN A COMPUTER VISION SYSTEM

CROSS REFERENCES TO RELATED APPLICATIONS

This application is a continuation of U.S. patent application Ser. No. 16/858,596, filed Apr. 25, 2020, and scheduled to issue as U.S. Pat. No. 11,410,265 on Aug. 9, 2022, which is a continuation of U.S. patent application Ser. No. 15/695,266, filed Sep. 5, 2017, and issued as U.S. Pat. No. 10,706,492 on Jul. 7, 2020, each of which is incorporated by reference in its entirety herein.

FIELD OF THE DISCLOSURE

Embodiments of the present disclosure generally relate to computer vision systems, and more specifically relate to image compression/decompression in such systems.

DESCRIPTION OF THE RELATED ART

Advanced driver assistance systems (ADAS) are designed to increase the situational awareness of a driver and road safety by providing essential information, warnings, and/or automatic intervention to reduce the possibility/severity of an accident. Depending on the safety aspects supported, such systems can be based upon one or more in-vehicle sensor systems such as radar, camera, light detection and range (LIDAR), and ultrasound based systems. Additionally, such systems can integrate and use external information sources such as global positioning systems, car data networks, and vehicle-to-vehicle or vehicle-to-infrastructure communication systems to efficiently and accurately achieve desired goals. Camera based ADAS is emerging as a key differentiator by original equipment manufacturers (OEM). Camera based ADAS uses various computer vision (CV) and machine learning (ML) technologies to perform real-time driving situation analysis and ultimately may use this information to, for example, warn the driver of possible danger or to autonomously intervene to mitigate danger.

The CV and ML techniques along with supporting systems such as image signal processing systems have a very high data bandwidth requirement in which multiple data transfers are needed in real time to meet hard/soft deadlines for availability of the data. For example, tens of Gigabytes of image and signal data may need to be stored and transferred every second between compute units on an embedded system-on-a-chip (SOC) and between the SOC and external memory. Solutions to reduce the memory bandwidth requirement are desirable.

SUMMARY

Embodiments of the present disclosure relate to methods and apparatus for image compression and decompression in a computer vision system. In one aspect, a computer vision system is provided that includes a camera capture component configured to capture an image from a camera, a memory, and an image compression decompression engine (ICDE) coupled to the memory and configured to receive each line of the image, and compress each line to generate a compressed bit stream. To compress a line, the ICDE is configured to divide the line into compression units, and compress each compression unit, wherein to compress a compression unit, the ICDE is configured to perform delta prediction on the compression unit to generate a delta predicted compression unit, compress the delta predicted compression unit using exponential Golomb coding to generate a compressed delta predicted compression unit, and add the compressed delta predicted compression unit to the compressed bit stream.

In one aspect, a method of image compression in a computer vision system is provided that includes receiving a line of an image, and compressing the line to generate a compressed bit stream by dividing the line into compression units, and compressing each compression unit by performing delta prediction on the compression unit to generate a delta predicted compression unit, compressing the delta predicted compression unit using exponential Golomb coding to generate a compressed delta predicted compression unit, and
adding the compressed delta predicted compression unit to the compressed bit stream.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency.

Embodiments of the disclosure provide for image compression and decompression in an embedded computer vision system that reduces the memory bandwidth needed to transfer image data between a system-on-a-chip (SOC) and external memory. In general, the image compression exploits the spatial redundancy of image pixel data in the horizontal direction to generate a compressed representation of the pixel data that reduces the amount of data transferred between compute units on the SOC and the external memory. In various embodiments, the pixel data compression may be performed using a combination of delta prediction, linear quantization, exponential Golomb coding, rate distortion optimization, and/or rate control techniques.

More specifically, each line of an image is divided into compression units, i.e., segments of consecutive pixels, that are compressed and stored in the external memory. In some embodiments, the compression units are losslessly compressed using a combination of delta prediction and exponential Golomb coding. In some embodiments, the compression units are compressed using a hybrid compression technique combining both lossy and lossless compression. The lossy compression uses a combination of quantization, delta prediction, exponential Golomb coding, and rate distortion optimization. In some such embodiments, rate control techniques are also applied. Further, in some embodiments, both lossless and hybrid compression are provided. In addition, in some embodiments, the compressed data is stored in external memory in a format that permits random access retrieval at the line level. In some such embodiments, the format also permits random access retrieval at the compression unit level within a line.

Embodiments are described herein with a focus on the compression protocol. One of ordinary skill in the art, having benefit of this description, will understand how to reverse the compression to perform the decompression.

Figure 1:
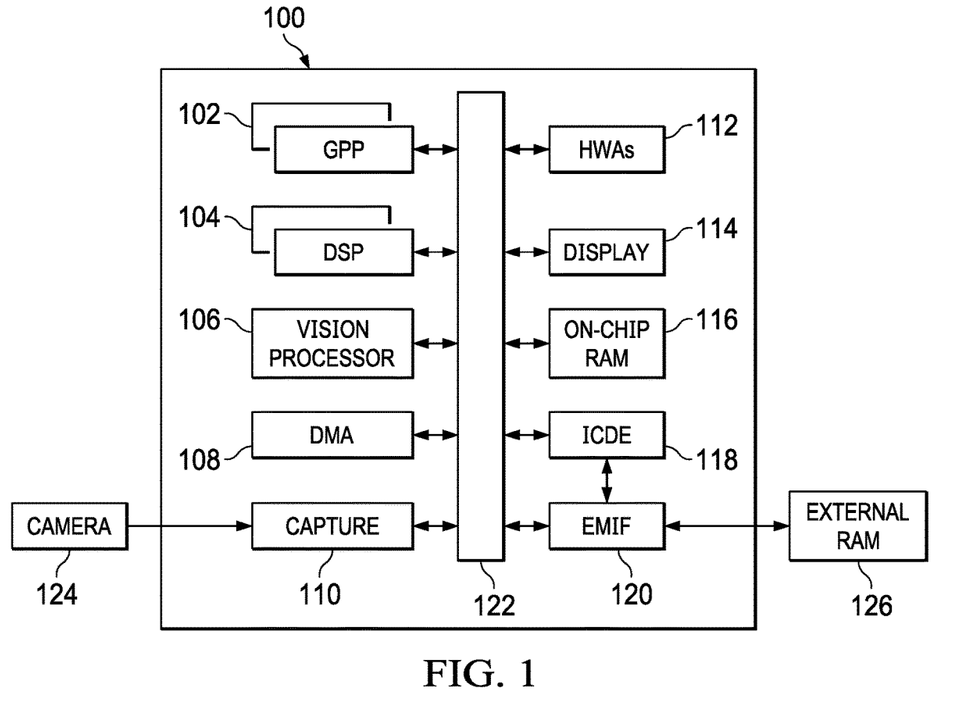
FIG. 1 is a high level block diagram of an example multiprocessor system-on-a-chip (SOC)

FIG. 1 is a high level block diagram of an example multiprocessor system-on-a-chip (SOC) 100 configured to support computer vision processing in a camera-based ADAS. The SOC 100 includes dual general purpose processors (GPP) 102, dual digital signal processors (DSP) 104, a vision processor 106, and various hardware accelerators (HWAs) 112 coupled via a high speed interconnect 122. The SOC 100 further includes a direct memory access (DMA) component 108, a camera capture component 110 that may be coupled to an external camera 124, a display management component 114, on-chip random access memory (RAM) 116, e.g., a computer readable medium, and an external memory interface (EMIF) 120 coupled to an external RAM 126, all of which are coupled to the processors 102, 104, the vision processor 106, and the HWAs 112 via the interconnect 122. The camera 124 may be coupled to the SOC 100 via an analog connection, an Ethernet cable, a low-voltage differential signaling (LVDS) cable, or other suitable wired or wireless connection. In addition, the SOC 100 may include a safety component (not shown) that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures.

The GPP 102 hosts the operating system and provides overall control of the operation of the SOC 100 including scheduling of the processing performed by the HWAs 112. The DSP 104 provides support for computer vision processing such as object detection and classification, which may use the output of one or more of the HWAs 112. The vision processor 106 is a vector processor tuned for computer vision processing such as gradient computation, orientation binning, histogram normalization, etc. The HWAs 112 may include, for example, a optical flow accelerator, a vision preprocessing accelerator, and/or an image scaling accelerator.

The external RAM 126 stores image data that may be accessed by various compute units of the SOC 100, i.e., the processors 102, 104, the vision processor 106, and/or the HWAs 112, via an image compression decompression engine (ICDE) 118. To reduce the bandwidth need to access the image data, the image data is compressed by the ICDE 118 prior to storage in the external RAM 126 and is decompressed by the ICDE 118 when read from the external RAM 126. Techniques that may be implemented by the ICDE 118 to compress the image data are described in reference to FIG. 2 and FIG. 3 herein. Formats for storing the compressed data are described in reference to FIG. 4, FIG. 5, FIG. 6, and FIG. 7 herein.

Figure 2:
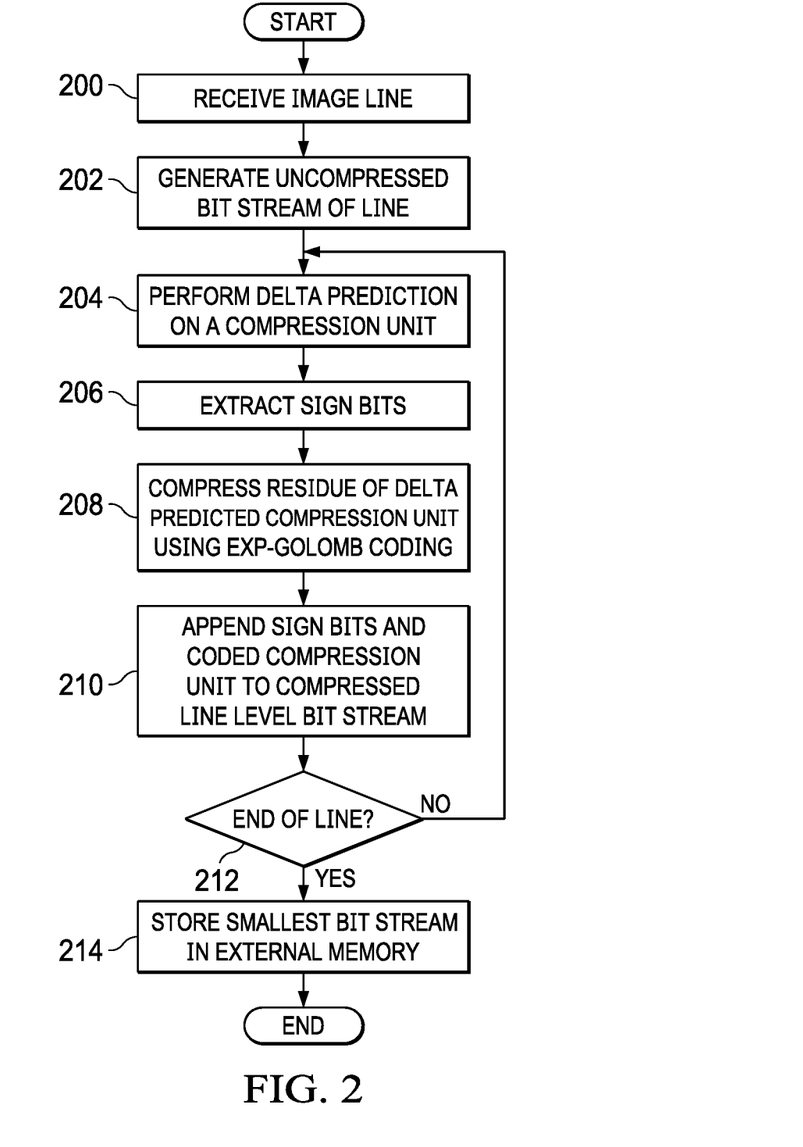
FIG. 2 and FIG. 3 are flow diagrams of methods for compressing a line of image data.
Figure 3:
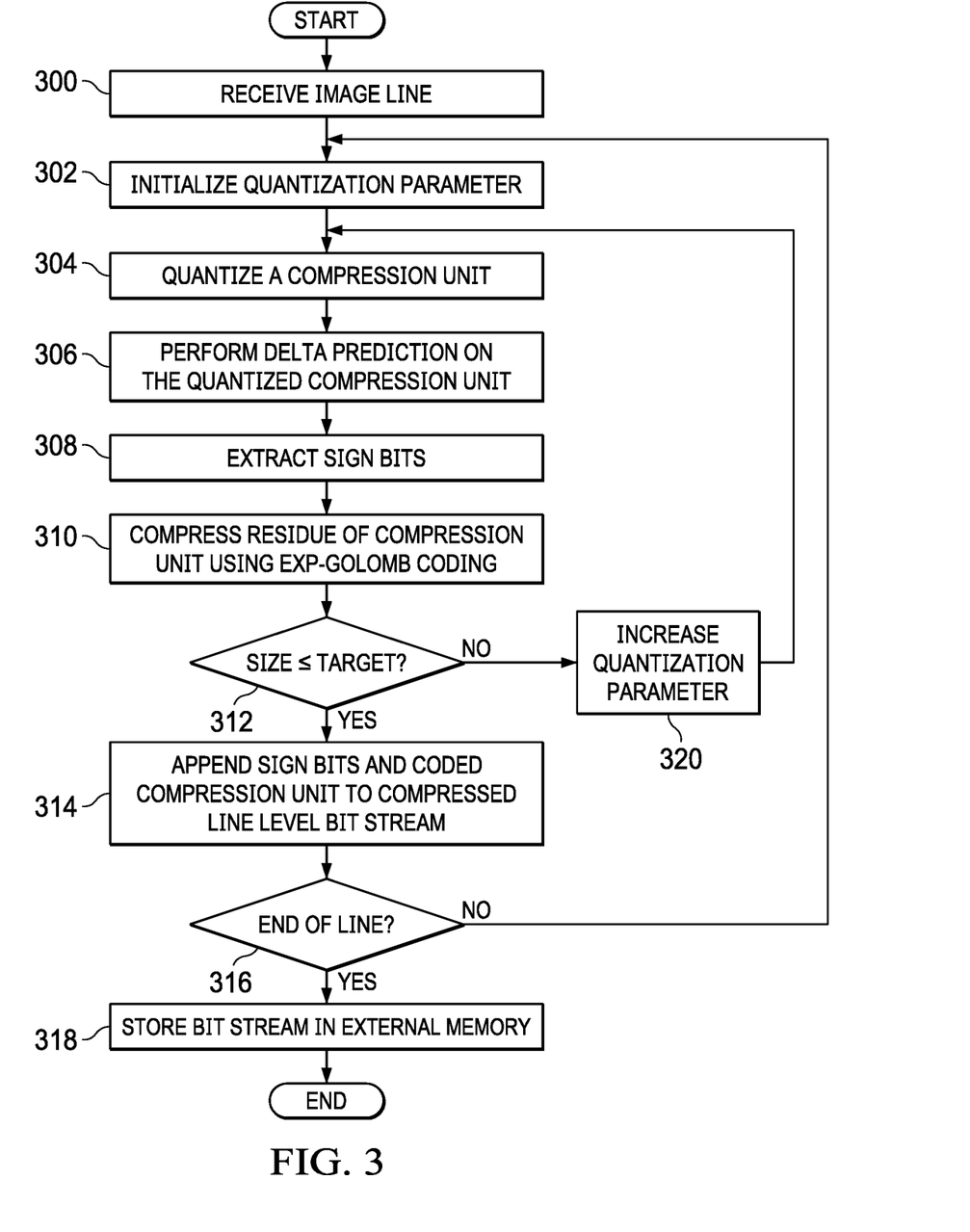

FIG. 2 and FIG. 3 are flow diagrams for methods for compressing a line of image data, one or more or which may be implemented, for example, by the ICDE 118 of FIG. 1. A method may be repeated for each line of an image to compress the entire image. In these methods, a line of image data is divided into multiple compression units, where a compression unit is a segment of consecutive pixels, and each compression unit is compressed separately. The size of a compression unit is implementation dependent and may be any suitable size. For example, the compression unit size may be chosen to minimize read and write overhead to memory, e.g., the external RAM 126.

FIG. 2 is a flow diagram of a method for lossless compression of a line of image data, i.e., the quality of the image data is not affected by the compression. Initially, the line of image data is received 200 and an uncompressed bit stream of the line is generated 202. The line is then divided into compression units and each compression unit is compressed and added to a compressed line level bit stream 204-212. To compress a compression unit, delta prediction is preformed 204 on the pixel data in the compression unit to generate a delta predicted compression unit. That is, in the delta predicted compression unit, the first value is the same as the first value in the original compression unit. Each subsequent value in the delta predicted compression unit is the difference or delta between the corresponding value in the original compression unit and the previous value in the original compression unit. For example, if the compression unit includes the values 100, 107, 106, 101, 105, then the delta predicted compression unit would include the values 100, 7, −1, −5, 4.

The sign bits are extracted 206 from the values in the delta predicted compression unit and the residue is compressed 208 using exponential Golomb (Exp-Golomb) coding. Any suitable order k Exp-Golomb code may be used. In some embodiments, several values of k are evaluated to find the best value for k for the compression unit, i.e., the value that yields the smallest number of bits. The sign bits and the Exp-Golomb coded compression unit are then appended 210 to the compressed line level bit stream. In some embodiments, the sign bits are stored as uncompressed data in the bit stream immediately preceding the Exp-Golomb coded compression unit. The compressed line level bit stream may be formatted to allow for random access at the compression unit level. Example formats for the compressed line level bit stream are described herein in reference to FIG. 4 and FIG. 6. After all of the compression units of the image line are compressed 212, the smallest of the uncompressed bit stream and the compressed bit stream is stored 214 in external memory. The bit stream is stored at a predetermined offset from the previously stored bit stream to permit random access at the line level.

FIG. 3 is a flow diagram of a method for hybrid compression of a line of image data. In this method, a target bit rate is used, i.e., each compression unit is compressed such that the size of the compressed compression unit is less than or equal to a specified number of bits. Any suitable target bit rate may be used and the target bit rate may be user specified.

In this method, a compression unit may be losslessly compressed or may be lossy compressed, i.e., the quality of the image data is reduced by the compression.

Initially, the line of image data is received 300 and a quantization parameter is initialized 302 to one, i.e., no quantization. The line is then divided into compression units and each compression unit is compressed and added to a compressed line level bit stream 304-314. To compress a compression unit, the compression unit is quantized 304 according to the quantization parameter and delta prediction is performed 204 on the pixel data in the compression unit to generate a delta predicted compression unit. Delta prediction is previously described herein.

The sign bits are extracted 308 from the values in the delta predicted compression unit and the residue is compressed 310 using exponential Golomb (Exp-Golomb) coding. Any suitable order k Exp-Golomb code may be used. In some embodiments, several values of k are evaluated to find the best value for k for the compression unit, i.e., the value that yields the smallest number of bits. The size of the combination of the sign bits and the Exp-Golomb coded compression unit is then compared 312 to the target bit rate. If the size is less than or equal to the target bit rate, the sign bits and the coded compression unit are appended 314 to the compressed line level bit stream. In some embodiments, the sign bits are stored as uncompressed data in the bit stream immediately preceding the Exp-Golomb coded compression unit. The compressed line level bit stream may be formatted to allow for random access at the line level and/or to allow for random access at the compression unit level. Example formats for the compressed line level bit stream are described herein in reference to FIG. 5 and FIG. 7. Note that if the quantization parameter is one at this point, the coding of the compression unit is lossless.

If the size is not less than or equal to the target bit rate, then the quantization parameter is increased, e.g., incremented by one, and the compression process 304-312 is repeated. After all of the compression units of the image line are compressed 316, the compressed bit stream is stored 316 in external memory. The bit stream is stored at a predetermined offset from the previously stored bit stream to permit random access at the line level.

In some embodiments, the method of FIG. 3 is modified such that rather than requiring a fixed target bit rate for each compression unit in a line, a rate control scheme is used in which if fewer bits than the target bit rate are needed to compress a compression unit, the extra bits are added to the target bit rate for the next compression unit such that, if needed, the number of bits used to code the next compression unit may use the target bit rate plus the extra bits.

Figure 4:
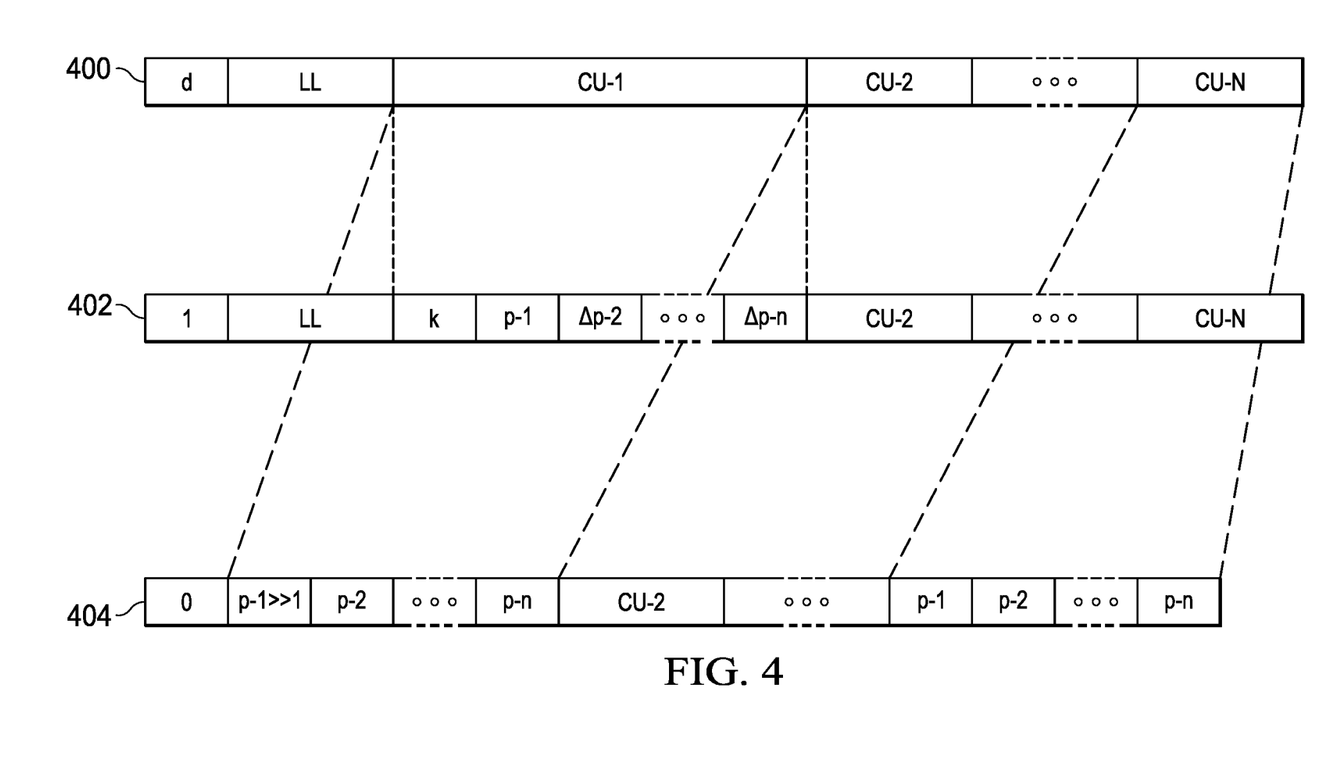
FIG. 4, FIG. 5, FIG. 6, and FIG. 7 are example formats for storing compressed image data.

FIG. 4 illustrates an example format for storing a lossless compressed line of image data such that each line of the compressed image can be randomly accessed. Line 400 illustrates the generic format, line 402 illustrates the format when the line is compressed, and line 404 illustrates the format when the line is not compressed. Referring first to line 400, an initial bit d in the line indicates whether or not the line is compressed. In this example, if the value of d is zero, then the line is not compressed; if the value is one, then the line is compressed. One of ordinary skill in the art will understand embodiments in which a value of zero indicates compression and a value of one indicates no compression. In the compressed format 402, this bit is followed by the number of bytes LL in the line. Including the number of bytes LL in the compressed bit stream informs the decoder of the size of the data to be read from memory. Further, if the compression units CU-N are compressed as shown in line 402, the bits of each compression unit are preceded by the order k used for the Exp-Golomb coding of the compression unit. In some embodiments, in the compressed format 402, the sign bit is included in each compressed compression unit. In some embodiments, the sign bits of the compressed compression units are stored separately from the compressed compression units and the deltas for each compressed compression unit are the absolute values of the deltas.

Figure 5:
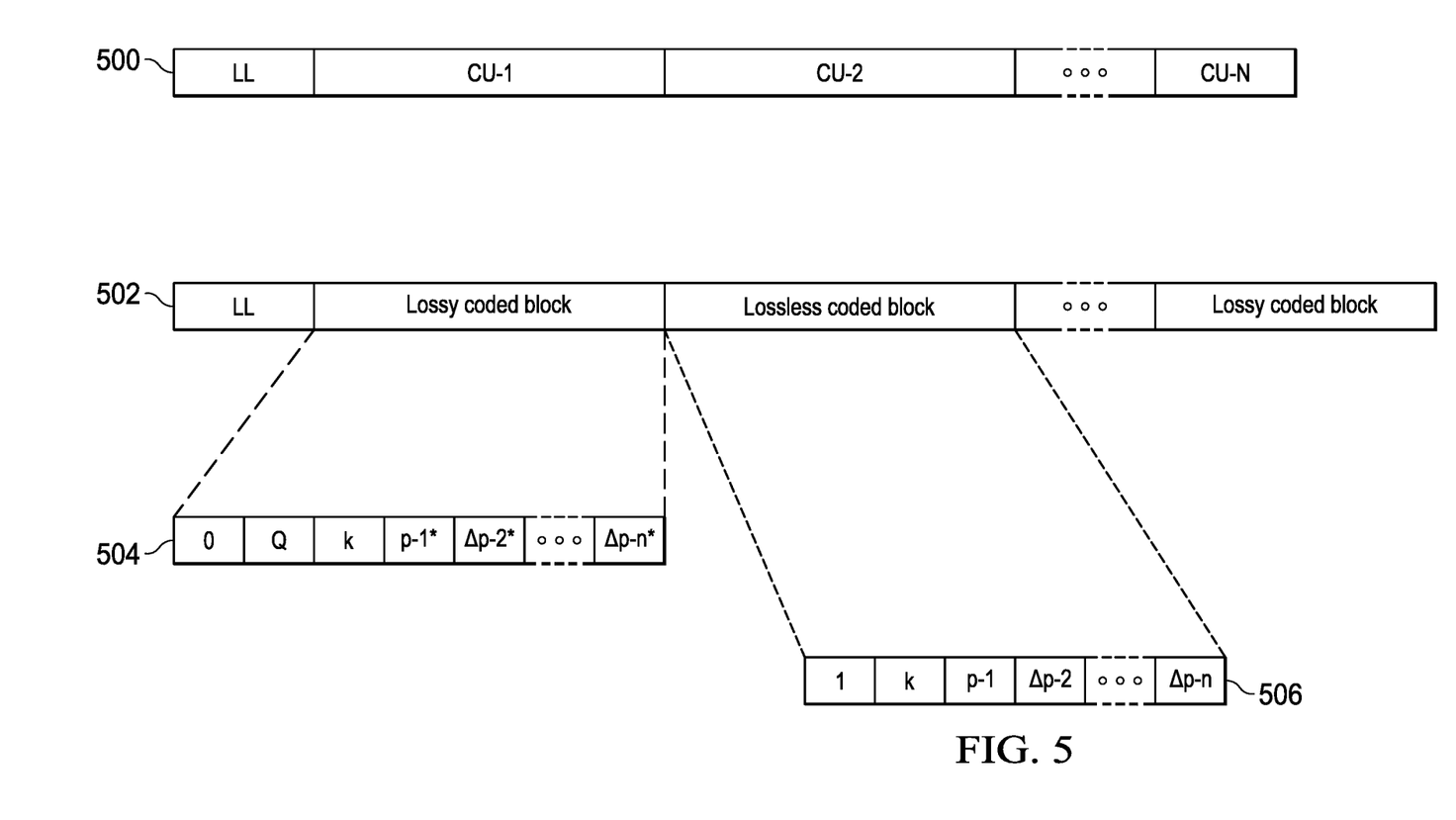

FIG. 5 illustrates an example format for storing a hybrid compressed line of image data such that each line of the compressed image can be randomly accessed. Line 500 illustrates the generic format, line 502 illustrates the format with an example combination of lossless and lossy compressed compression units, line 504 illustrates the format of a lossy compressed compression unit, and line 506 illustrates the format of a lossless compressed compression unit. As shown in line 500 and line 502, the initial field in the line contains the number of bytes LL in the line. Including the number of bytes LL in the bit stream informs the decoder of the size of the data to be read from memory. As shown in line 504 and 506, each compressed compression unit begins with a bit indicating whether the compression unit is lossless encoded or lossy encoded.

If the compression unit is lossless encoded, then, as illustrated in line 506, the next field in the compressed compression unit is the order k used for the Exp-Golomb coding of the compression unit and the remainder of the compressed compression unit is the Exp-Golomb coded deltas of the compression unit. If the compression unit is lossy encoded, then, as illustrated in line 504, the next field in the compressed compression unit is the quantization factor used to quantize the pixel values in the compression unit. The quantization factor is followed by the order k used for the Exp-Golomb coding of the compression unit and the remainder of the compressed compression unit is the Exp-Golomb coded deltas of the quantized compression unit. In some embodiments, the sign bit is included in each compressed compression unit. In some embodiments, the sign bits of the compressed compression units are stored separately from the compressed compression units and the deltas for each compressed compression unit are the absolute values of the deltas.

Figure 6:
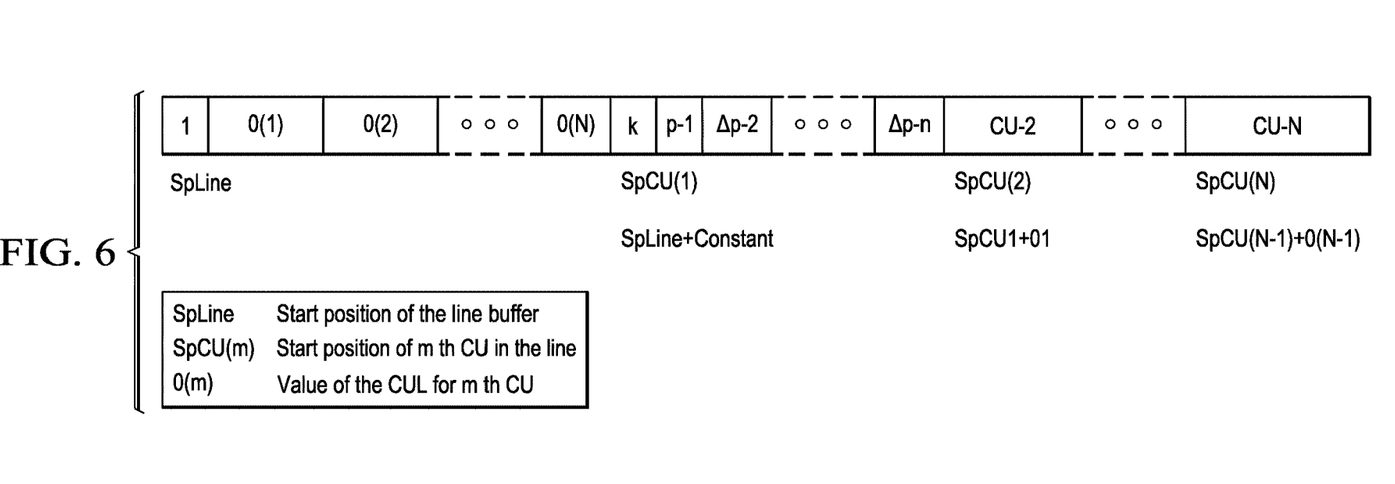

FIG. 6 illustrates an example format for storing a lossless compressed line of image data such that each compression unit of the compressed image can be randomly accessed. In this example, the offset 0(N) of each compressed compression unit in the line relative to the previous coding unit is stored prior to the compressed compression units. In this example, the offset for the first compressed compression unit is the number of bits or bytes needed to represent the value of d and all of the offsets. The other offsets are offsets relative to the previous coding unit, i.e., are the number of bits in the previous compressed compression unit, referred to as CUL (compression unit length) in the figure. In some embodiments, the sign bit is included in each compressed compression unit. In some embodiments, the sign bits of the compressed compression units are stored separately from the compressed compression units and the deltas for each compressed compression unit are the absolute values of the deltas.

Figure 7:
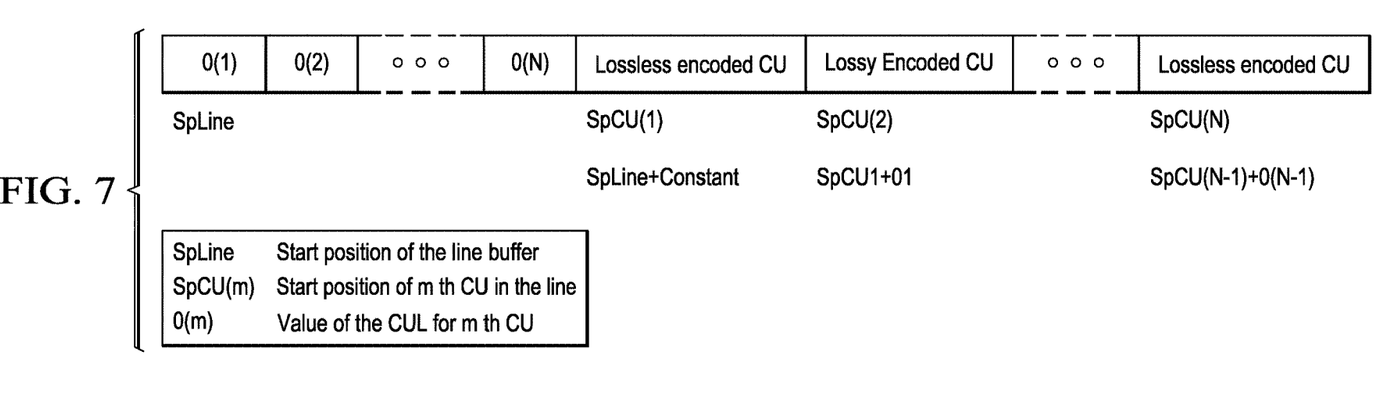

FIG. 7 illustrates an example format for storing a hybrid compressed line of image data such that each compression unit of the compressed image can be randomly accessed. In this example, the offset 0(N) of each compressed compression unit in the line relative to the previous compressed compression unit is stored prior to the compressed compression units. In this example, the offset for the first compressed compression unit is the number of bits or bytes needed to represent the value of d and all of the offsets. The other offsets are offsets from the previous compressed compression unit, i.e., are the number of bits in the previous compressed compression unit, referred to as CUL (compression unit length) in the figure. In some embodiments, the sign bit is included in each compressed compression unit. In some embodiments, the sign bits of the compressed compression units are stored separately from the compressed compression units and the deltas for each compressed compression unit are the absolute values of the deltas.

OTHER EMBODIMENTS

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in reference to ADAS. One of ordinary skill in the art will understand embodiments for computer vision applications other than ADAS, such as, for example, industrial applications, robotics, and drones.

In another example, embodiments have been described herein in which an SOC includes a single ICDE. One of ordinary skill in the art will understand embodiments including more than one ICDE.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A system comprising:
a memory configured to store values of a segment of pixels of a camera; and
an image compression decompression engine (ICDE) coupled to the memory and configured to:
obtain the values of the segment of pixels from the memory;
generate a delta predicted compression unit based on differences between the values of the segment of pixels;
extract sign bits from the delta predicted compression unit to generate residual values;
compress the residual values to generate a compressed delta predicted compression unit;
compare a size of a combination of the sign bits and the compressed delta predicted compression unit to a target bit rate; and
based on a determination that the size is less than or equal to the target bit rate, append the sign bits and the compressed delta predicted compression unit to a compressed bit stream.

2. The system of claim 1, wherein the ICDE is further configured to:
based on a determination that the size is less than the target bit rate,
determine a difference between the target bit rate and the size; and
increase the target bit rate based on the difference for a next segment of pixels.

3. The system of claim 1,
wherein to compress the residual values, the ICDE is configured to compress the residual values using exponential Golomb coding to generate the compressed delta predicted compression unit.

4. The system of claim 3, wherein the ICDE is further configured to:
evaluate two or more values of an order of the exponential Golomb coding; and
determine a value of the two or more values of the order that yields a smallest number of bits for the respective compressed delta predicted compression unit.

5. The system of claim 1, wherein the segment of pixels is a segment of consecutive pixels, and wherein to generate the delta predicted compression unit, the ICDE is configured to:
set a first value in the delta predicted compression unit to be equal to a first value in the segment of consecutive pixels; and
set each subsequent value in the delta predicted compression unit to be equal to a difference between a corresponding value in the segment of consecutive pixels and a previous value in the segment of consecutive pixels.

6. The system of claim 1,
wherein the values of the segment of pixels is part of an uncompressed bit stream, and
wherein the ICDE is further configured to:
generate a compressed bit stream that includes the compressed delta predicted compression unit; and
store, to the memory, a smallest stream of the uncompressed bit stream and the compressed bit stream.

7. The system of claim 1, wherein:
the ICDE is further configured to quantize the values of the segment of pixels, prior to generating the delta predicted compression unit, to generate quantized values of the segment of pixels; and
to generate the delta predicted compression unit, the ICDE is configured to generate the delta predicted compression unit based on differences between the quantized values of the segment of pixels.

8. The system of claim 7, wherein the ICDE is configured to quantize the values of the segment of pixels based on a quantization parameter, and wherein the ICDE is further configured to increase the quantization parameter based on a determination that the size is not less than or equal to the target bit rate.

9. The system of claim 1, wherein the ICDE is part of a system-on-a-chip and the memory is external to the system-on-a-chip.

10. A method comprising:
obtaining, by a system-on-a-chip (SOC), values of a segment of pixels of a camera;
generating, by the SOC, a delta predicted compression unit based on differences between the values of the segment of pixels;
extracting, by the SOC, sign bits from the delta predicted compression unit to generate residual values;
compressing, by the SOC, the residual values to generate a compressed delta predicted compression unit;
comparing, by the SOC, a size of a combination of the sign bits and the compressed delta predicted compression unit to a target bit rate; and based on determining that the size is less than or equal to the target bit rate, appending, by the SOC, the sign bits and the compressed delta predicted compression unit to a compressed bit stream.

11. The method of claim 10,
wherein compressing the residual values comprises compressing the residual values using exponential Golomb coding to generate the compressed delta predicted compression unit.

12. The method of claim 11, further comprising:
evaluating two or more values of an order of the exponential Golomb coding; and
determining a value of the two or more values of the order that yields a smallest number of bits for the respective compressed delta predicted compression unit.

13. The method of claim 10, wherein the segment of pixels is a segment of consecutive pixels, and wherein generating the delta predicted compression unit comprises:
setting a first value in the delta predicted compression unit to be equal to a first value in the segment of consecutive pixels; and
setting each subsequent value in the delta predicted compression unit to be equal to a difference between a corresponding value in the segment of consecutive pixels and a previous value in the segment of consecutive pixels.

14. The method of claim 10,
wherein the values of the segment of pixels is part of an uncompressed bit stream, and
wherein the method further comprises:
generating a compressed bit stream that includes the compressed delta predicted compression unit; and
storing a smallest stream of the uncompressed bit stream and the compressed bit stream.

15. The method of claim 10, wherein:
the method further comprises quantizing the values of the segment of pixels, prior to generating the delta predicted compression unit, to generate quantized values of the segment of pixels; and
generating the delta predicted compression unit comprises generating the delta predicted compression unit based on differences between the quantized values of the segment of pixels.

16. The method of claim 15, wherein:
quantizing the values of the segment of pixels comprises quantizing the values of the segment of pixels based on a quantization parameter; and
the method further comprises increasing the quantization parameter based on determining that the size is not less than or equal to the target bit rate.

17. A non-transitory computer-readable medium having executable instructions stored thereon, configured to be executable by one or more processors for causing the one or more processors to:
obtain values of a segment of pixels of a camera;
generate a delta predicted compression unit based on differences between the values of the segment of pixels;
extract sign bits from the delta predicted compression unit to generate residual values;
compress the residual values to generate a compressed delta predicted compression unit;
compare a size of a combination of the sign bits and the compressed delta predicted compression unit to a target bit rate; and
based on a determination that the size is less than or equal to the target bit rate, append the sign bits and the compressed delta predicted compression unit to a compressed bit stream.

18. The non-transitory computer-readable medium of claim 17, wherein the instructions are configured to be executable by the one or more processors for further causing the one or more processors to:
compress the residual values using exponential Golomb coding to generate the compressed delta predicted compression unit.

19. The non-transitory computer-readable medium of claim 18, wherein the instructions are configured to be executable by the one or more processors for further causing the one or more processors to:
evaluate two or more values of an order of the exponential Golomb coding; and
determine a value of the two or more values of the order that yields a smallest number of bits for the respective compressed delta predicted compression unit.

20. The non-transitory computer-readable medium of claim 17, wherein the segment of pixels is a segment of consecutive pixels, and wherein the instructions are configured to be executable by the one or more processors for further causing the one or more processors to:
set a first value in the delta predicted compression unit to be equal to a first value in the segment of consecutive pixels; and
set each subsequent value in the delta predicted compression unit to be equal to a difference between a corresponding value in the segment of consecutive pixels and a previous value in the segment of consecutive pixels.

* * * * *